United States Patent [19]

Greenwood

[11] Patent Number: 4,641,548
[45] Date of Patent: Feb. 10, 1987

[54] DRIVE LINE FOR A TRACK-LAYING VEHICLE

[75] Inventor: C. J. Greenwood, Leyland, United Kingdom

[73] Assignee: Leyland Vehicles Limited, Leyland, England

[21] Appl. No.: 644,804

[22] Filed: Aug. 27, 1984

[30] Foreign Application Priority Data

Aug. 25, 1983 [GB] United Kingdom ............... 8322937

[51] Int. Cl.⁴ ...................... F16H 37/10; B62D 11/16
[52] U.S. Cl. ........................................ 74/691; 74/682; 74/695; 74/705; 180/6.44
[58] Field of Search ......... 74/665 B, 665 GA, 665 N, 74/681, 682, 687, 695, 705, 720.5, 740, 720; 180/6.44, 6.7

[56] References Cited

U.S. PATENT DOCUMENTS

| | | | |
|---|---|---|---|
| 3,426,621 | 2/1969 | Mooney, Jr. et al. | 74/720.5 |
| 3,492,891 | 2/1970 | Livezey | 74/687 X |
| 3,534,635 | 10/1970 | Polak | 74/687 X |
| 3,548,682 | 10/1968 | Schofield et al. | 74/691 |
| 3,596,535 | 8/1971 | Polak | 74/720.5 |
| 4,280,579 | 7/1981 | Zaunberger et al. | 180/6.7 X |
| 4,309,917 | 1/1982 | Leet | 74/687 X |
| 4,420,991 | 12/1983 | Meyerle | 180/67 X |
| 4,471,669 | 9/1984 | Seaberg | 74/687 |
| 4,485,691 | 12/1984 | Reed | 74/720.5 |
| 4,505,168 | 3/1985 | Booth et al. | 180/6.44 X |

FOREIGN PATENT DOCUMENTS 48308 8/1983 European Pat. Off. .............. 74/691

Primary Examiner—Leslie Braun
Assistant Examiner—John Malcolm White
Attorney, Agent, or Firm—Hayes, Davis & Soloway

[57] ABSTRACT

A tank engine drive shaft (1) drives respective tank track drive shaft (20, 30) by way of a continuously-variable ratio transmission variator (200), a transfer system (12, 13, 15) including coupling means (C1, C2, 16, 17), a cross shaft (18, 19) and respective summing epicyclic gears (7, 6). Steering of the tank is achieved by a steer variator (100) also driven (2, 3) by the engine, which outputs differential rotations as further inputs (82, 55) to the summing epicyclic gears (7, 6). The drive line operates in four distinct regimes: reverse, low I, low II and high, by means of an epicyclic gear brake (B), and clutches (H, C1 and C2). The two parts (16, 17) of the coupling means are made to rotate in opposite directions by the annulus (15) of the epicyclics.

As the tank accelerates from rest in low I regime, with brake B applied and clutch C1 applied but clutch H disengaged, the cross shaft (18, 19) decelerates. At a predetermined forward speed, the cross shaft is stationary and the change to low II is effected synchronously. As the tank accelerates further forwards in low II regime, the cross shaft accelerates from rest in the opposite direction, with clutch C2 instead of clutch C1 engaged.

The use of the same transfer system for both parts of the low regime enables the use of a smaller variator (200) for an equivalent performance.

8 Claims, 3 Drawing Figures

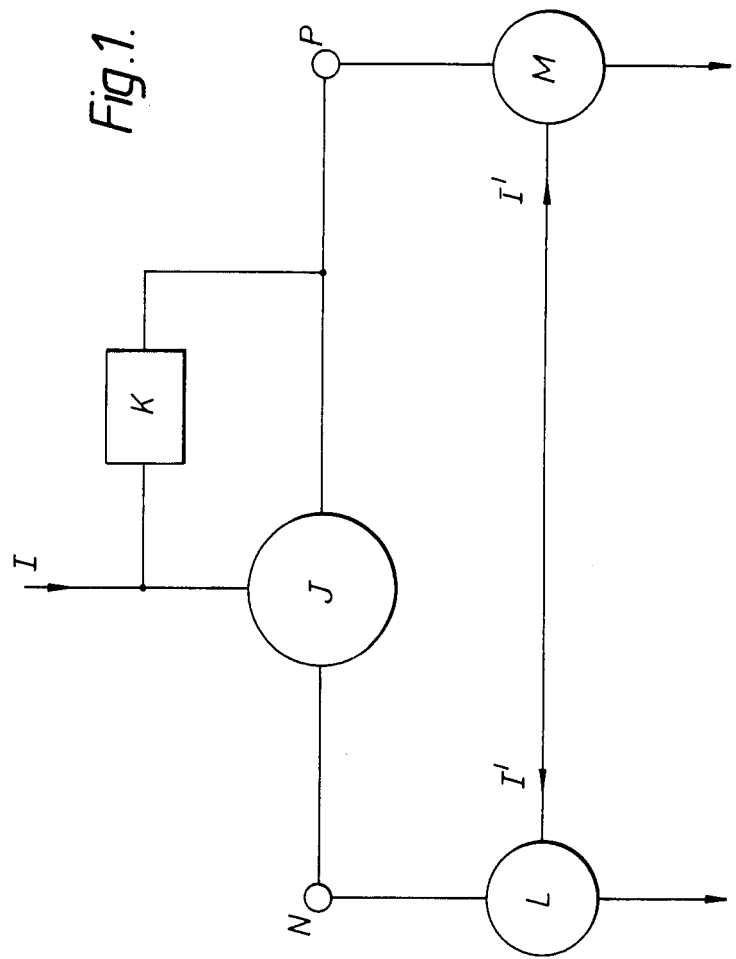

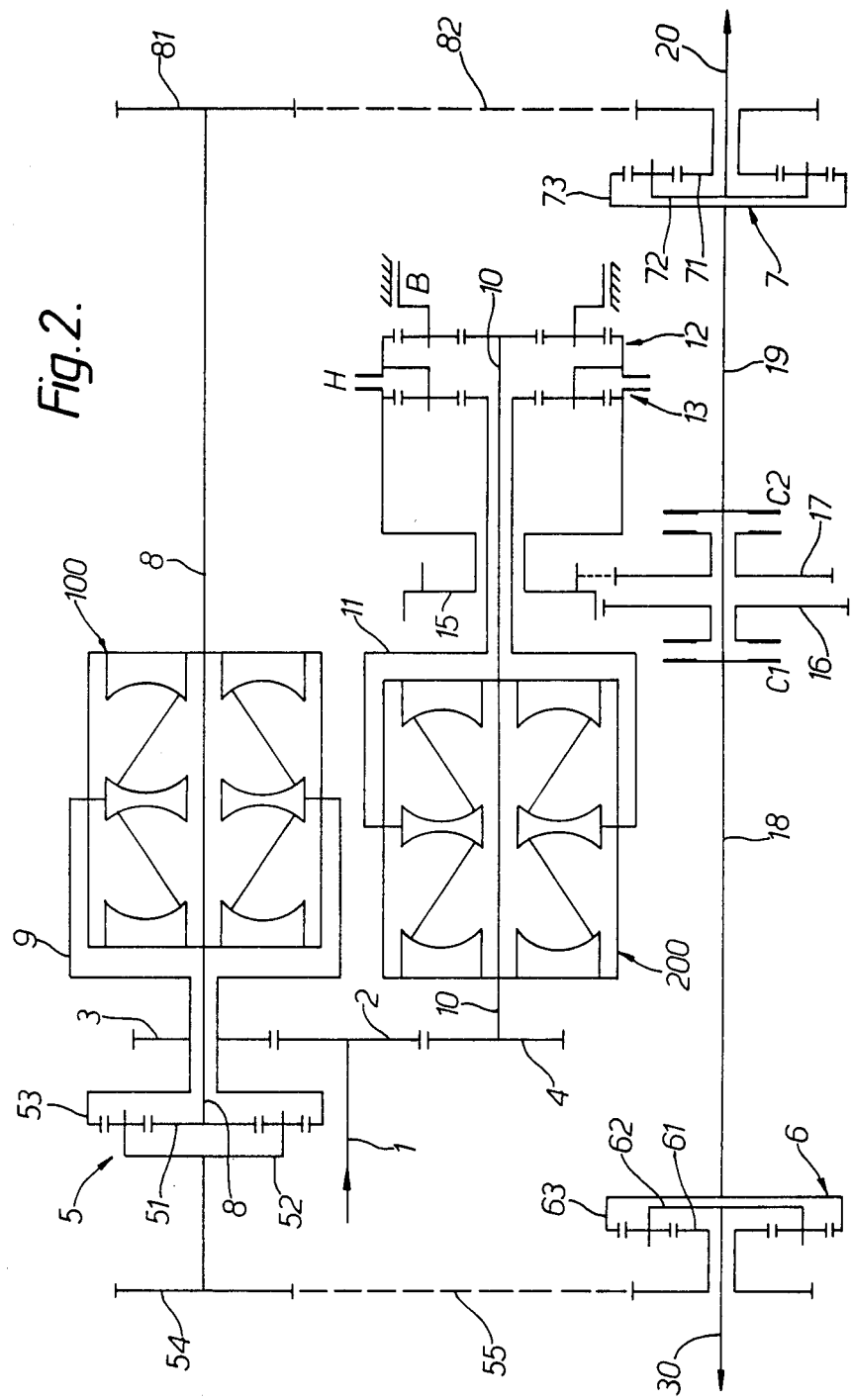

DRIVE LINE FOR A TRACK-LAYING VEHICLE

This invention relates to a drive line for a track-laying vehicle such as a military tank, and in particular to a drive line employing speed shaft steering.

The invention consists in a drive line for a track-laying vehicle having speed shaft steering, comprising two track drive shafts and a drive transmission whose output drives a shaft coupled to both track drive shafts by way of epicyclic gears having further inputs for steering, whereby the said shaft normally rotates while the vehicle is stationary, characterised in that the drive transmission has a continuously-variable ratio, and in that the drive transmission drives the shaft by way of a transfer system operable in at least low regime I and low regime II modes, the transfer system having a summing epicyclic gear arranged to sum the input and the output of the drive transmission and to provide a summed output, and coupling means for coupling the said summed output to the said shaft in either rotational sense to select either low regime I or low regime II modes, low regime I being operable for vehicle velocities from rest to a first predetermined velocity, and low regime II being operable from the first to a second, higher, predetermined velocity.

In the preferred form of drive line, the coupling means changes mode synchronously between low regime I and low regime II, the said shaft being stationary at the changeover point. Moreover, in the preferred embodiment the transfer system is further operable in a high regime mode in which the said summing epicyclic gear is locked and links the output of the drive transmission directly to the input of the coupling means, the input of the drive transmission being free to rotate relative to the transfer system.

In order that the invention may be better understood, two preferred embodiments will now be described with reference to the accompanying drawings, wherein:

FIG. 1 is a schematic diagram of a drive line for a track-laying vehicle having speed shaft steering, and FIG. 2 is a diagram showing a drive line in accordance with a first embodiment of the invention and FIG. 3 is a diagram of a drive line in accordance with a second embodiment of the invention.

FIG. 1 is a schematic illustration of a drive line for a track-laying vehicle having speed shaft steering and incorporating a continuously-variable ratio steering transmission, in accordance with the invention of our U.S. Pat. No. 4,569,251. The drive line of FIG. 1 is described in detail in our co-pending application, and no more than a brief description will be given here.

Drive I from the tank engine is coupled both to a summing epicyclic gear J and to the input of a continuously-variable ratio transmission K, for example of the toroidal race rolling traction type. The output of the continuously-variable ratio steering transmission K is coupled both to a further input of the summing epicyclic gear J, and also through suitable gearing P to a further summing epicyclic gear M whose output drives one of the tank track drive shafts. The output of the summing epicyclic gear J is connected via suitable gearing N to a further summing epicyclic gear L whose output drives the other tank track drive shaft. Each summing epicyclic gear L, M has a further input driven I' by the tank engine. The tank has speed shaft steering, as opposed to null shaft steering, i.e. there is a rotating steering input to both epicyclics L, M when the tank and its track drive shafts are stationary.

FIG. 2 shows the first embodiment of the drive line according to the invention. In this example, a continuously-variable ratio transmission 100 acts as a steer variator, and a similar continuously-variable ratio transmission 200 transmits driving power from the engine through a transfer system to a cross shaft 18, 19 and thence to respective tank track drive shafts 20, 30.

The steer variator 100 receives its drive input from the engine crankshaft 1 by way of gearing 2, 3. Gearing 3 is coupled to the input shaft 9 of the steer variator and also to the annulus 53 of a simple epicyclic gear 5. The output shaft 8 of the steer variator is connected at one end through gearing 81, 82 to the sun gear 71 of a simple epicyclic gear 7 which supplies drive to drive shaft 20. The other end of the output shaft 8 of the steer variator 100 is connected to the sun gear 51 of the simple epicyclic gear 5, of which the planet carrier 52 is connected to drive the sun gear 61 of simple epicyclic gear 6 by way of gearing 54, 55.

As explained in our co-pending patent application referred to above, the simple epicyclic gear 5 causes the gears 54 and 81 to rotate in opposite rotational senses. The change of ratio introduced by the simple epicyclic gear 5 is compensated for by suitably selecting the ratio of gearing 55 and 82; in this example, gearing 55 provides a ratio of $-2.86$ and gearing 82 a ratio of $+1.0$. Simple epicyclic gear 6 sums the drive from the cross shaft (at 18) and from the steer variator to provide a steered output on drive shaft 30. Simple epicyclic gear 7 sums the drive from the cross shaft (19) and from the steer variator to provide a steered output on drive shaft 20.

The drive line of the invention employs speed shaft steering, which means that the sun gears 61, 71 as well as the annuli 63, 73 of simple epicyclic gears 6, 7 respectively are made to rotate when the tank drive shafts 30, 20 are stationary. Both the steering input (from gearing 55, 82) and the cross shaft 18, 19 are rotating when the tank is stationary. The invention lies particularly in the manner in which drive is supplied from the drive transmission 200 to the track drive shafts 20, 30.

A transfer system comprising an epicyclic gear arrangement 12, 13, 15 and brake B and a coupling means consisting of clutches C1, C2 and gears 16, 17 allows the drive line to be operated in four distinct regimes for optimising its performance. The four drive regimes are: reverse, low I, low II and high, corresponding respectively to tank speeds in reverse, low forward, medium forward and high forward.

Input shaft 10 of drive variator 200 is joined to the sun gear of simple epicyclic gear 12 of which the planet carrier may be held by a brake B and of which the annulus is connected to the planet carrier of a second simple epicyclic gear 13. The output shaft 11 of the drive variator 200 is connected to the sun gear of the second simple epicyclic gear 13. The annulus 15 of the second simple epicyclic gear 13 provides an output in one rotational sense to gear 16, and in the opposite rotational sense to gear 17 of the coupling means. The coupling means employs clutches C1 and C2 to engage to the cross shaft 18, 19 either gear 16 or gear 17 according to the regime selected. A clutch H is operable, in two of the regimes, to lock the planet carrier to the annulus in the second simple epicyclic gear 13.

For the reverse regime, clutch H is engaged and clutch C1 is engaged. The input shaft 10 rotates freely relative to the transfer system since brake B is not applied. Output shaft 11 drives annulus 15 directly, which in turn drives the cross shaft through gear 16 and clutch C1.

The high regime, for the highest forward speeds, is engaged by engaging clutch H, and engaging clutch C2. It operates in the same way as the reverse regime except that annulus 15 rotates gear 17 in the opposite rotational sense. For low I regime clutch H is not engaged, clutch C1 is engaged, and brake B is applied. Simple epicyclic gears 12, 13 then act to sum the inputs from input shaft 10 and output shaft 11 and supply a summed output through annulus 15 and gear 16 to clutch C1. For low II regime, clutch C2 is engaged instead of clutch C1, effectively reversing the drive to the cross shaft.

The cross shaft 18, 19 is stationary only at the changeover between low I regime and low II regime, allowing this change to proceed synchronously. Thus, as the tank proceeds forwards from rest, it commences in low I regime with the cross shaft being decelerated as the tank is accelerated. At a first predetermined forward speed, when the cross shaft is stationary, the change of regimes is effected. Upon further acceleration of the tank, the cross shaft accelerates in the opposite direction until a second predetermined forward speed is attained. The transfer system is preferably designed for synchronous change between low II and high regimes, so that there is no relative movement between the plates of clutch H at the second predetermined forward speed. As the tank accelerates in high regime, the cross shaft accelerates from its second predetermined forward speed to its highest speed.

In a second embodiment of the invention (not illustrated), which also operates in the four regimes, the only significant difference from the first embodiment is that the clutch H is replaced by two clutches and a third simple epicyclic gear. This second drive line is more efficient than the first, since losses in the variator 200 are significantly reduced, but this is at the expense of the extra clutch and gearing.

For high regime, both clutches are engaged, and have the same effect as the clutch H of FIG. 2. For reverse regime only one of the two clutches is engaged. For low I and low II regimes, a brake corresponding to the brake B is applied, the one of the two clutches is disengaged and the other of the two clutches is engaged. Apart from these differences, the transfer system operates in the same way as in the first embodiment of FIG. 2.

The principal advantage obtained by the invention, which is apparent in both embodiments described above, is that the same transfer system is used for both parts of the low regime, low I and low II, enabling smaller variators to be employed than would otherwise be the case for an equivalent performance.

A further advantage with the second embodiment arises from the provision of the two clutches. In slippery conditions, for example, it is sometimes desirable to start the tank from rest with both of these clutches engaged; they then act effectively as a transmission brake, preventing the sudden acceleration of only one track. Moreover, with both clutches engaged, a neutral turn can be achieved, with the tracks being propelled in opposite rotational senses while the tank is stationary.

I claim:

1. A drive line for a track-laying vehicle having speed shaft steering, comprising two track drive shafts and a drive transmission whose output drives a shaft coupled to both track drive shafts by way of epicyclic gears having further inputs for steering, whereby the said shaft normally rotates while the vehicle is stationary, characterised in that the drive transmission has a continuously-variable ratio, and in that the drive transmission drives the shaft by way of a transfer system operable in at least low regime I and low regime II modes, the transfer system having a summing epicyclic gear arranged to sum the input and the output of the drive transmission and to provide a summed output, and coupling means for coupling the said summed output to the said shaft in either rotational sense to select either low regime I or low regime II, the changeover between low regime I and low regime II occurring synchronously, with the said shaft being stationary at the changeover point, low regime I being operable for vehicle velocities from rest to a first predetermined velocity, and low regime II being operable from the first to a second, higher, predetermined velocity.

2. A drive line in accordance with claim 1, wherein the transfer system comprises a clutch which, when engaged, locks the said summing epicyclic gear to effect a high regime whereby drive is transferred directly from the output of the drive transmission to the said coupling means.

3. A drive line in accordance with claim 2, wherein the change from low regime II to high regime is effected synchronously, there being no relative movement between the plates of the said clutch at the changeover point.

4. A drive line in accordance with claim 1, wherein the said transfer system summing epicyclic gear comprises a first simple epicyclic gear having a sun gear driven by the input of the drive transmission, and a planet carrier connected to braking means, and a second simple epicyclic gear having a sun gear connected to the output of the drive transmission, a planet carrier connected to the annulus of the first simple epicyclic gear, and an annulus providing an output to the said coupling means.

5. A drive line in accordance with claim 4, comprising a clutch which, when engaged, couples the planet carrier to the annulus in the second simple epicyclic gear.

6. A drive line in accordance with claim 1, wherein the coupling means comprises input gears coupled in opposite rotational senses to the remainder of the transfer system, each gear arranged to drive the said shaft through a respective clutch.

7. A drive line in accordance with claim 1, wherein the said shaft is a cross shaft driven by the coupling means and connected at either end to summing epicyclic gears each of which provides an output to a respective track drive shaft.

8. A tank incorporating a drive line comprising two track drive shafts and a drive transmission whose output drives a shaft coupled to both track drive shafts by way of epicyclic gears having further inputs for steering, whereby the said shaft normally rotates while the vehicle is stationary, characterised in that the drive transmission has a continuously-variable ratio, and in that the drive transmission drives the shaft by way of a transfer system operable in at least low regime I and low regime II modes, the transfer system having a summing epicyclic gear arranged to sum the input and the output of the drive transmission and to provide a summed output, and coupling means for coupling the said summed output to the said shaft in either rotational sense to select either low regime I or low regime II, the changeover between low regime I and low regime II occurring synchronously, with the said shaft being stationary at the changeover point, low regime I being operable for vehicle velocities from rest to a first predetermined velocity, and low regime II being operable from the first to a second, higher, predetermined velocity.

* * * * *

UNITED STATES PATENT AND TRADEMARK OFFICE
CERTIFICATE OF CORRECTION

PATENT NO. : 4,641,548
DATED : February 10, 1987
INVENTOR(S) : Christopher John Greenwood It is certified that error appears in the above-identified patent and that said Letters Patent is hereby corrected as shown below:

Column 1, lines 44-46, delete "and Fig. 3 is a diagram of a drive line in accordance with a second embodiment of the invention".

On the title page "3 Drawing Figures" should read -- 2 Drawing Figures --.

Signed and Sealed this

Twenty-fourth Day of May, 1988

Attest:

DONALD J. QUIGG

*Attesting Officer*    *Commissioner of Patents and Trademarks*